(12) United States Patent
Buisson et al.

(10) Patent No.: US 7,824,157 B2
(45) Date of Patent: Nov. 2, 2010

(54) SYSTEM FOR RETAINING BLADES IN A ROTOR

(75) Inventors: Herve Marc Philippe Buisson, Savigny le Temple (FR); Jean-Luc Christian Yvon Goga, Champagne sur Seine (FR); Eric Jacques Lefebvre, Champigny (FR)

(73) Assignee: SNECMA, Paris (FR)

( * ) Notice: Subject to any disclaimer, the term of this patent is extended or adjusted under 35 U.S.C. 154(b) by 750 days.

(21) Appl. No.: 11/739,429

(22) Filed: Apr. 24, 2007

(65) Prior Publication Data

US 2007/0253822 A1    Nov. 1, 2007

(30) Foreign Application Priority Data

Apr. 27, 2006    (FR) ................................. 06 51500

(51) Int. Cl.
*F01D 5/30* (2006.01)
(52) U.S. Cl. .................. 416/220 R; 416/221
(58) Field of Classification Search ............. 416/220 R, 416/221
See application file for complete search history.

(56) References Cited

U.S. PATENT DOCUMENTS

| 3,096,074 A * | 7/1963 | Pratt et al. .................. 416/215 |
| 3,656,865 A | 4/1972 | Spears, Jr. |
| 5,281,098 A * | 1/1994 | Glynn et al. ................. 416/221 |
| 6,488,473 B1 * | 12/2002 | Lee et al. ................. 416/220 R |
| 7,198,463 B2 * | 4/2007 | Kanebako et al. ........... 415/175 |
| 7,229,252 B2 * | 6/2007 | Hermiston et al. ...... 416/220 R |

FOREIGN PATENT DOCUMENTS

| EP | 0 286 227 A2 | 10/1988 |
| EP | 1096107 A2 | 5/2001 |
| EP | 1223309 A1 | 7/2002 |
| EP | 1607579 A | 12/2005 |
| GB | 1255 873 | 12/1971 |
| GB | 2244100 A | 11/1991 |
| GB | 2258273 A | 2/1993 |

* cited by examiner

*Primary Examiner*—Ninh H Nguyen
(74) *Attorney, Agent, or Firm*—Oblon, Spivak, McClelland, Maier & Neustadt, L.L.P.

(57) ABSTRACT

The rotor disk carries an axial retention plate facing slots having blade roots received therein, the disk and the plate are shaped so as to define outer circumferential interlock and inner circumferential interlock.

10 Claims, 3 Drawing Sheets

SYSTEM FOR RETAINING BLADES IN A ROTOR

The invention relates to a rotor, in particular a fan rotor of an airplane turbojet, and more particularly the invention relates to a blade retention system. It also relates to a turbojet fan fitted with such a rotor and to an airplane turbojet in which the fan is fitted with such a rotor.

BACKGROUND OF THE INVENTION

In a bypass turbojet, the rotor of the fan carries a plurality of blades. Each blade includes a splined blade root that is engaged in a groove formed in the periphery of a disk, which groove is referred to as a "slot". The slots are defined between radial projections referred to as "disk teeth" that are provided with lateral projections overlying the edges of the slots, and consequently said slots are shaped so as to retain the blade roots. The slots are open both upstream and downstream. In this specification, the terms "upstream" and "downstream" are used to designate respectively a position towards the front towards or the rear of the rotor, i.e. relative to the air flow direction.

On assembly, each blade root is engaged in its slot by sliding it in from the upstream end of the slot. The upstream ends are then closed, in particular by an annular part referred to as a "cowl rear ring". This part is secured to the rotor disk. It also serves to hold in place longitudinal spacers inserted in the slots under the blade roots.

In the event of a blade being lost, the adjacent blade tilts because pivoting is made possible by the shape of the spacer, and it moves forwards. The blade retention system must be capable of withstanding this axial thrust.

Document EP 1 223 309 describes such a blade retention system in which the spacer head, driven by the blade, moves upstream and comes into contact with said cowl rear ring. It therefore needs to be dimensioned so as to be capable of withstanding a large force. The spacer, which also has a force transmission function, needs to be a metal element of sufficient strength to perform this role. Consequently, said cowl rear ring and the spacers inserted in the various slots are metal parts that are relatively heavy.

OBJECT AND SUMMARY OF THE INVENTION

A main object of the invention is to reduce the weight of the rotor, and in particular of its upstream blocking system.

To this end, the invention relates mainly to a rotor comprising a disk provided with slots in its outer periphery, blades attached to said disk, each blade having a blade root engaged and retained in such a slot, and an annular axial retention plate fastened to the upstream side of said disk in register with open ends of said slots, said disk and said plate being shaped to define an outer circumferential interlock extending radially outside said open ends, and an inner circumferential interlock extending radially inside said open ends.

The invention applies in particular to a turbojet fan rotor.

Thus, the plate serving solely to perform upstream interlocking functions is significantly lighter than the cowl rear ring used for this purpose in the prior art.

In addition, the spacer no longer contributes to transmitting forces upstream; it can therefore be lightened. In particular, it may be made of composite material. Such an elastically-deformable spacer inserted between each blade root and the bottom of the corresponding slot serves only to urge the blade outwards in order to keep the blade roots in contact with the lateral projections overlying the edges of the slots.

BRIEF DESCRIPTION OF THE DRAWINGS

The invention can be better understood and other advantages thereof appear more clearly in the light of the following description given purely by way of example and made with reference to the accompanying drawings, in which.

MORE DETAILED DESCRIPTION

Figure 1:
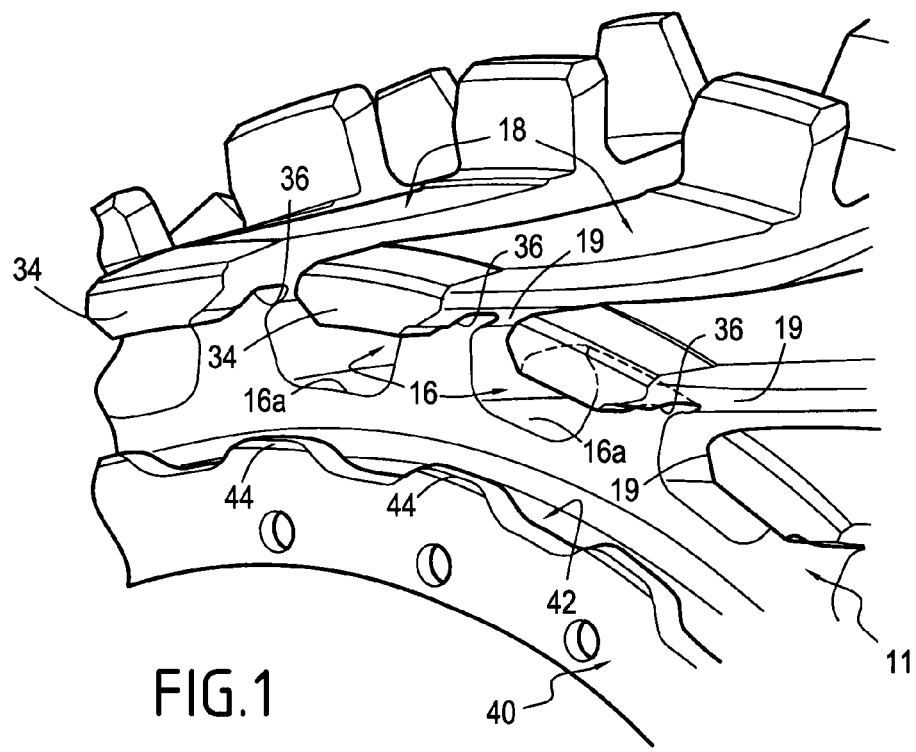
FIG. 1 is a fragmentary perspective view of a fan rotor disk in accordance with the invention.

The fan rotor of a turbojet as shown comprises a disk 11 with a plurality of blades 14 attached to the disk. For this purpose, the disk has slots 16 in its outer periphery. These slots 16 are defined between teeth 18 of the disk that are provided with lateral projections 19 overlapping the edges of said slots 16. Furthermore, each blade 14 comprises a blade root 20 shaped to be capable of engaging in a corresponding slot 16. The slots 16 are of a shape that is designed to retain the blade roots. A longitudinal spacer 22 is inserted between the bottom of each slot 16 and the corresponding blade root 20, to stabilize the position of the blade radially. The slots 16 have open upstream ends 16a, as shown. An annular axial retention plate 26 is fastened to the upstream side of the disk, overlapping the open ends 16a of the slots. Consequently, the annular plate serves to prevent a blade from escaping from its slot in the upstream direction in the event of it being subjected to a force urging it in that direction. This occurs in particular in the event of a blade being lost. Under such circumstances, the adjacent blade tilts by pivoting on the spacer 22 and it moves upstream. The blade root comes into contact with the axial retaining plate 26 which must be capable of withstanding the resulting force.

For this purpose, the disk 12 and the plate 26 are shaped to interlock twice. There is both circumferentially outer interlock 30 located radially outside said open ends 16a of the slots, and circumferentially inner interlock 32 extending radially inside said open ends.

The term "circumferential interlock" is used to cover any arrangement between two annular parts comprising two series of teeth belonging respectively to said two parts. The two parts interlock together by being docked axially and then turned so as to place the teeth of the two series of teeth in register so that they co-operate in the event of an axial force being applied to either one of the parts.

In the example described, the disk 11 includes, between its slots, outer circumferential engagement teeth 34 which extend the above-defined teeth 18 of the disk in an upstream direction. These teeth 34 thus project upstream at a position that is radially external relative to said open ends 16a of the slots 16. Grooves 36 are formed in these teeth 34, which grooves open out into the inside faces of the teeth.

In addition, the disk 11 also has an annular flange 40 projecting upstream and located radially internally relative to said open ends 16a of the slots 16. This annular flange is spaced apart from the disk so as to define an annular groove 42. It is crenellated so as to define teeth that are circumferentially distributed. These teeth form part of said inner circumferential interlock 32.

The retention plate 26 has two series of teeth 48 and 50 that are circumferentially distributed, respectively at the outer periphery and at the inner periphery of an annular web 46. When the retention plate 26 is fastened to the disk, the web is placed facing said open ends 16a of the slots 16. The teeth 48 form part of the outer circumferential interlock and the teeth 50 form part of the inner circumferential interlock.

Furthermore, the retaining plate 26 includes an upstream flange 54 that extends radially inwards. In the assembled position, this flange is against the annular flange 40 of the disk. The two flanges are assembled together by bolts.

Figure 5:
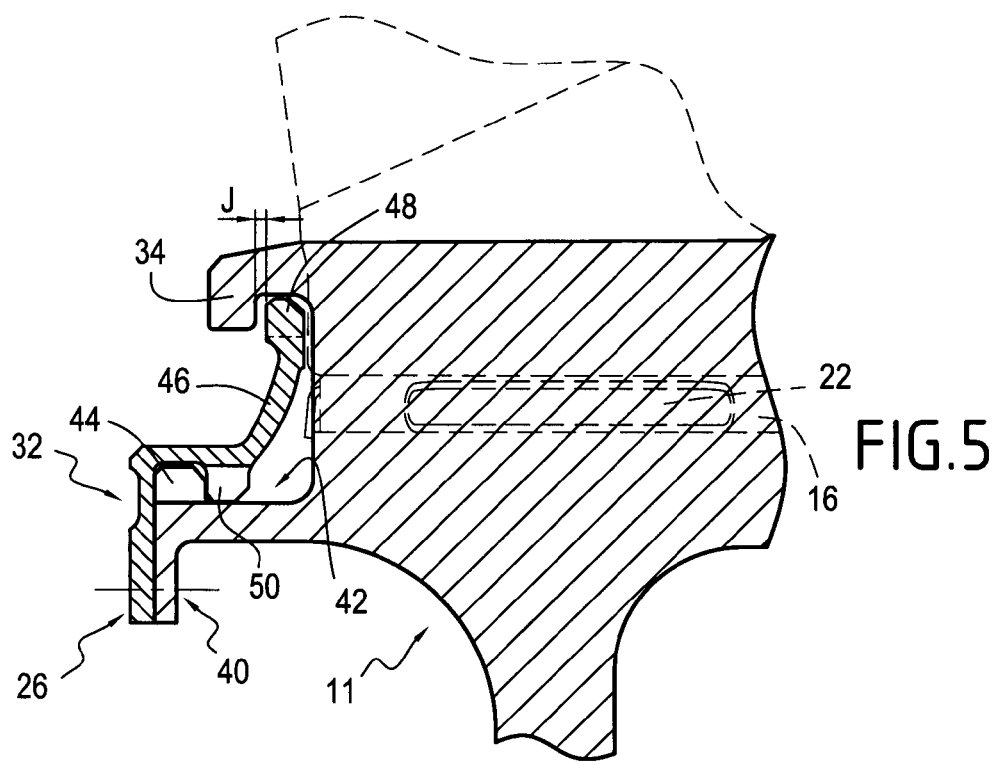
FIG. 5 is a diagrammatic radial section view of the rotor, showing how it is assembled.
Figure 6:
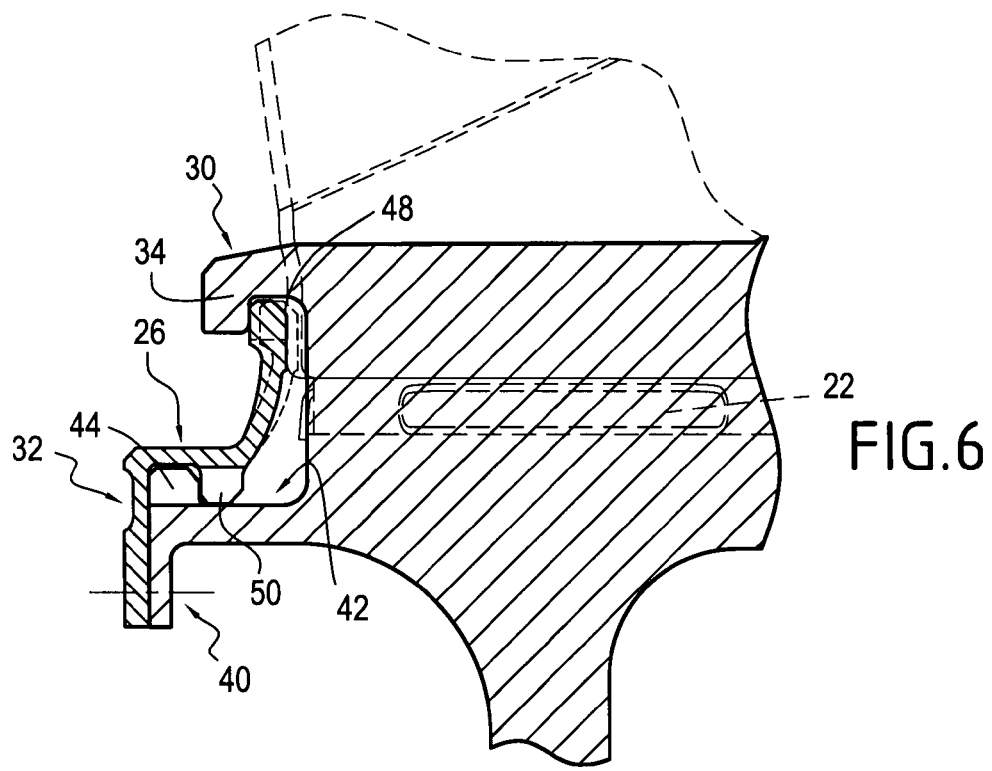
FIG. 6 is a view analogous to FIG. 5, showing the behavior of the blade retention plate in the event of a blade being lost.

As shown in FIGS. 5 and 6, the annular web 46 is deformable, and an axial clearance J is defined on assembly between the co-operating interlock teeth 34, 48, and more particularly in this example in the outer interlock. This enables the web to deform before said outer interlock teeth come into contact. Thus the energy of an impact caused by a blade root moving is initially absorbed by the web on its own. This damping reduces impact when forces are taken up by the two interlocks.

Figure 2:
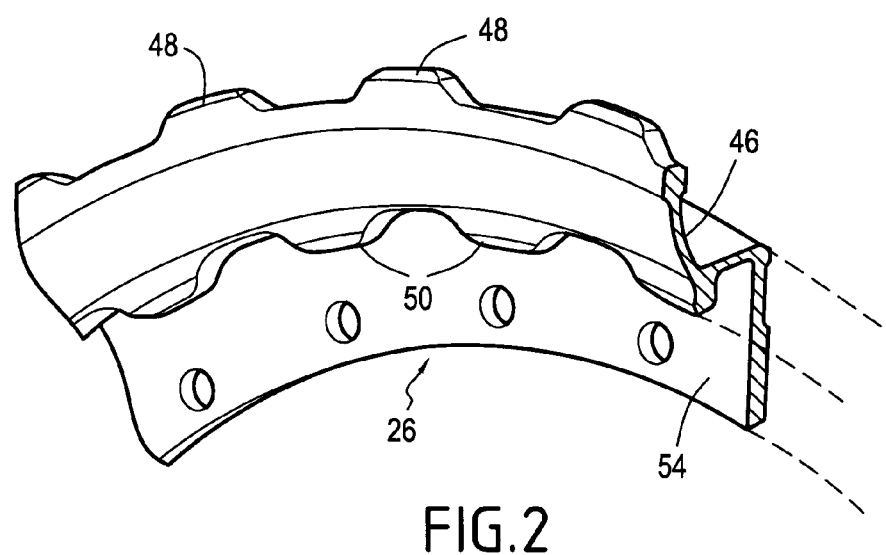
FIG. 2 is a fragmentary perspective view showing the axial retaining plate for fastening to the upstream side of the disk.
Figure 3:
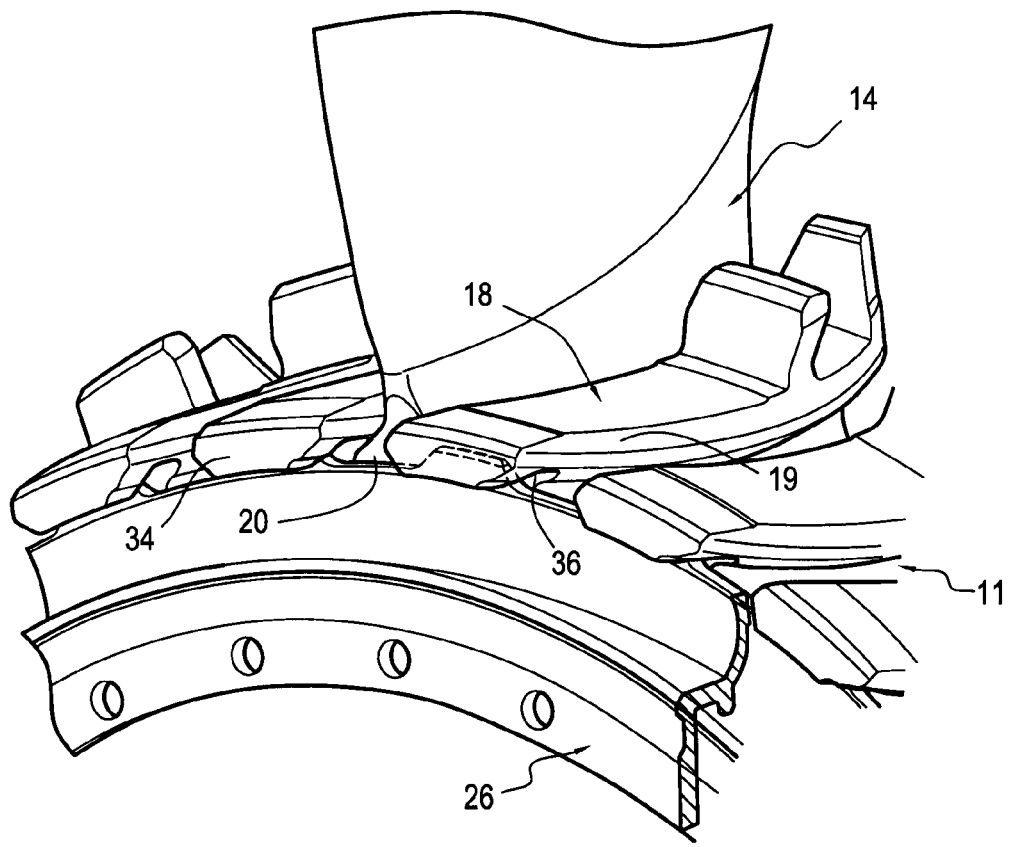
FIG. 3 is a fragmentary perspective view of the rotor, with only a single fan blade being shown, for greater clarity.

Furthermore, the co-operating teeth 34, 48-44, 50 of the outer and inner interlock rows are circumferentially offset by an angle corresponding to half the angle at the center between two adjacent slots. Consequently, as can be seen in FIG. 2, the inner and outer teeth 48 and 50 of the plate are angularly offset. The same applies to the teeth 34, 44 defined on the disk. For each slot 16, the forces in the two interlocks are distributed over a "retention" triangle defined between two outer bearing zones and one inner bearing zone.

Figure 4:
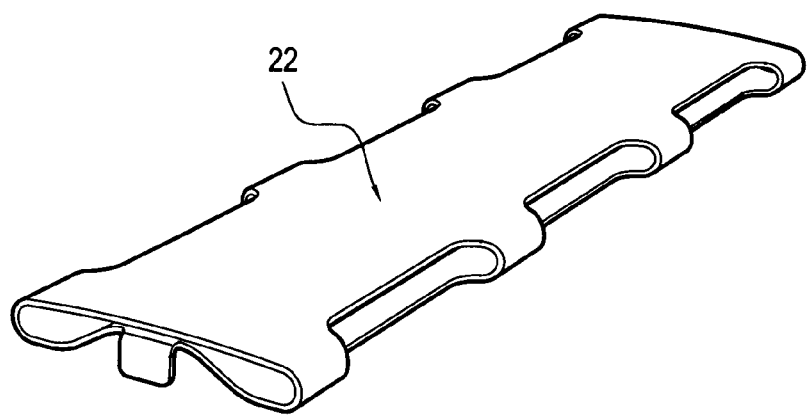
FIG. 4 is a detail view showing an elastically-deformable spacer in perspective.

The elastically-deformable spacer 22 as shown in FIG. 4 is advantageously made of a composite material. However, even if it is made of metal, its weight remains small since is it not designed to transfer the force from the blade root towards the axial retention means.

It should be observed that machining the grooves 36 is a turning operation that is simple and inexpensive, and that is performed before the slots are formed in the disk.

The profile of the retention plate between the two series of teeth is optimized for absorbing the energy of the impact caused by a blade root being displaced.

During assembly, the fan blades 14 are put into place in their respective slots and the wedges 22 are positioned under the blade roots. The plate 26 is presented in such a manner that the teeth 48, 50 can engage in the gaps between the teeth 34, 44 of the disk. When the teeth 48, 50 of the plate are respectively in register with the grooves 36 and the inner groove 42, the operator can turn the plate and proceed with fastening it to the flange.

In normal operation, the aerodynamic forces urge the fan blades axially upstream. The blade roots thus bear against the retention plate. If a blade is subjected to a sudden axial thrust in the upstream direction (because of the adjacent blade, as mentioned above), then the plate 26, which is blocked against its inner interlock, deforms so as to damp the impact of the force. At the end of that deformation, the plate comes to bear against the inner faces of the teeth 34 of the disk forming part of the outer interlock. The retention energy is then spread over the above-described "retention" triangle.

The clearance defined in the outer interlock makes it easier for the retention plate to deform.

What is claimed is:

1. A rotor comprising a disk provided with slots in its outer periphery, blades attached to said disk, each blade having a blade root engaged and retained in such a slot, and an annular axial retention plate fastened to the upstream side of said disk in register with open ends of said slots, said disk and said plate being shaped to define an outer circumferential interlock extending radially outside said open ends, and an inner circumferential interlock extending radially inside said open ends,
wherein said disk includes, between said slots, teeth of said outer circumferential interlock that project upstream externally relative to said open ends, and wherein grooves are formed in said teeth, which grooves are open in the inside faces of the teeth.

2. A rotor according to claim 1, wherein said disk includes an annular flange projecting upstream internally relative to said open ends, and crenellated in order to define circumferentially distributed teeth forming part of said inner circumferential interlock.

3. A rotor according to claim 2, wherein said retention plate includes an upstream flange extending radially outwards, adjacent to said annular flange of said disk and fastened thereto.

4. A rotor according to claim 1, wherein said retention plate has two series of teeth that are circumferentially distributed, respectively at the outer periphery and at the inner periphery of an annular web placed facing said open ends of said slots, the two series of teeth respectively forming part of said outer circumferential interlock and part of said inner circumferential interlock.

5. A rotor according to claim 4, wherein said annular web is deformable, and wherein axial clearance is defined on assembly between the co-operating teeth of an above-specified interlock, to enable said web to deform before said co-operating teeth come into contact.

6. A rotor according to claim 5, wherein said axial clearance is defined between the co-operating teeth of said outer interlock.

7. A rotor according to claim 4, wherein the co-operating teeth of said outer and inner interlocks are circumferentially offset.

8. A rotor according to claim 1, wherein an elastically-deformable spacer is inserted between each blade root and the bottom of the corresponding slot.

9. An airplane turbojet fan, comprising a rotor according to claim 1.

10. An airplane turbojet, including a fan having a rotor according to claim 1.

* * * * *